United States Patent Office 3,038,936
Patented June 12, 1962

3,038,936
CATALYZED OXIDATION OF TRIFLUORO-ETHANOL
Milton Braid, Springfield Township, Montgomery County, and Francis Lawlor, Philadelphia, Pa., assignors to Pennsalt Chemicals Corporation, Philadelphia, Pa., a corporation of Pennsylvania
No Drawing. Filed June 25, 1957, Ser. No. 667,976
10 Claims. (Cl. 260—531)

This invention relates to the catalyzed oxidation of 2,2,2-trifluoroethanol.

2,2,2-trifluoroethanol, referred to hereinafter briefly as trifluoroethanol, is resistant to the action of many common chemical reagents, including a number of the common oxidizing agents. The oxidation of trifluoroethanol has been reported previously in the literature to be accomplished by the use of chromic acid. This reagent is expensive; furthermore, it is reported that the oxidation cannot be stopped at the aldehyde, but proceeds all the way to trifluoroacetic acid. By contrast, the present invention provides a method of utilizing inexpensive sources of oxygen in an oxidation process which may be controlled as desired to give trifluoroacetic acid or trifluoroacetaldehyde as the principal product thereof.

It is an object of the present invention to provide a novel method for the catalytic oxidation of trifluoroethanol.

It is a further object of the present invention to provide a novel method for the oxidation of trifluoroethanol with gaseous oxygen.

Another object of this invention is to provide a novel method for the production of trifluoroacetaldehyde from trifluoroethanol.

It is an additional object of this invention to provide a method for the conversion of trifluoroethanol to trifluoroacetic acid and/or trifluoroacetaldehyde wherein the degree of oxidation of the product may be controlled at will.

These and other objects of the present invention will be apparent from a consideration of the following specification and claims.

In accordance with the present process, trifluoroethanol is contacted with oxygen in the presence of a catalyst which is an oxide of a metal capable of existing in more than one oxidation state.

The oxygen with which the trifluoroethanol is contacted may be molecular oxygen, $O_2$, monatomic oxygen, O, or ozone, $O_3$. In accordance with one embodiment of this invention, trifluoroethanol is oxidized by contact with a gaseous source of oxygen. Illustrative of useful gaseous sources of oxygen are oxygen gas itself, air, oxygen-enriched air, ozone and the like. This mode of operation of the present process employing a gaseous source of oxygen is particularly preferred when the desired product of the reaction is trifluoroacetaldehyde as further described hereinbelow.

Alternatively, oxygen can be supplied to the trifluoroethanol by a chemical source of oxygen such as a peroxy compound. One class of peroxy compounds which may be employed in accordance with this invention comprises inorganic peroxides such as hydrogen peroxide, potassium persulphate, sodium perborate and similar compounds. Hydrogen peroxide offers the particular advantage that only water is obtained as a byproduct when oxygen is evolved therefrom, and is especially preferred. If desired, organic peroxy compounds, such as trifluoroperacetic acid, benzoyl peroxide cumene hydroperoxide, and the like, may be used as an oxygen source in the present reactions; however, organic peroxy compounds are generally less preferred, as compared to inorganic peroxides, because the organic compounds are more expensive and may produce ensuing complications in the separation of resulting products.

As a catalyst for the process of the invention there is employed an oxide of a metal capable of existing in more than one oxidation state. Metals having a plurality of potential valence states and capable of existing in more than one oxidation state comprise heavy metals in the "B" groups of the periodic table, such as copper, nickel, platinum and the like (as illustrated in Lange's Handbook of Chemistry, 1944, 5th ed., pp. 54–55). Preferred in the present invention as catalysts are the oxides of vanadium, chromium, molybdenum, tungsten and uranium. Vanadium pentoxide is particularly preferred.

While the catalytic oxide may be used by itself in carrying out the present process, in many cases the catalyst is preferably introduced into the reaction zone as a surface layer on a solid carrier. As the catalyst carrier there may be used any of the usual inert solid catalyst supports such as silica gel or alumina. If desired, one or more adjuvants or promotors, such as potassium sulphate, may form a component of the catalyst composition.

The products of the catalytic oxidation of trifluoroethanol in accordance with this invention comprise trifluoroacetaldehyde and trifluoroacetic acid. The nature of the oxidation product obtained is governed by the choice of operating conditions and particularly by the source of oxygen utilized; depending on operating conditions, the oxidation product may comprise either the acid or the aldehyde individually, or a mixture of the two. The embodiment of this invention wherein gaseous oxygen is used for the oxidation of trifluoroethanol is preferred for production of trifluoroacetaldehyde as the principal product. When vigorous oxidizing agents of the type of hydrogen peroxide and similar peroxy compounds are utilized in the practice of the invention, the oxidation is conducted with facility to form chiefly trifluoroacetic acid. The reaction products with either oxygen source generally contain a mixture of trifluoroacetaldehyde and trifluoroacetic acid, with one or the other predominating, in accordance with the process conditions used. By suitable adjustment of reaction conditions such as temperature, pressure reactant ratios, time, and other such variables, the reaction may be controlled, if desired, so as to produce either the acid or the aldehyde as the substantially exclusive product.

The procedure by which the reaction is carried out will vary depending on the source of oxygen. When gaseous oxygen, that is oxygen gas itself, or air, is employed as an oxidizing agent, the oxidation is conveniently carried out in the vapor phase by passing a gaseous mixture of the reactants through a fixed or fluidized bed of catalyst. When the reaction is carried out in liquid phase, as when a liquid source of oxygen like hydrogen peroxide or oxygen under pressure is employed as an oxidizing agent, the catalyst is conveniently admixed with the liquid phase in the form of a finely divided powder and suspended in the reactant mixture. Wasteful decomposition of hydrogen peroxide can be minimized by gradual introduction of the peroxide into a suspension of the catalyst in the trifluoroethanol.

As the quantity of oxygen supplied to the trifluoroethanol controls the quantity of trifluoroethanol oxidized and for optimum conversions, it will be preferred to provide oxygen from the oxygen source in amount which is at least the theoretical equivalent of the quantity of trifluoroethanol contacted therewith in the presence of the reaction catalyst. The equivalent quantity of oxygen will vary depending on the desired product: One gram-atom of oxygen is consumed per gram-molecule of trifluoroethanol in producing the aldehyde; and one gram-molecule of oxygen per gram-molecule of trifluoroethanol, in producing the acid therefrom. High proportions of oxidizing agent as compared to the alcohol favor formation of the acid, and the proportion of oxygen source to the alcohol may accordingly be varied so as to control the course of the reaction. A large excess of the oxidizing agent may be used if desired; however, peroxides should be handled with caution, to avoid conditions leading to violent and uncontrolled reaction.

The reaction is exothermic and provision must be made for adequate cooling to maintain control of the reaction. When the reaction is carried out in the vapor phase, the temperature is advantageously maintained in the range from about 200° to 300° C. and preferably at 250° to 275° C. Once the reaction temperature is attained, cooling may be necessary and can be supplied by using the reactant feed, thus preheating the reactants, or by employing outside cooling, either alone or in conjunction with such reactant feed preheating. In liquid phase reaction, the rate of addition of the oxidizing agent to the trifluoroethanol-catalyst mixture can be so controlled as to permit a balance between heat output of the reaction and the cooling capacity of the reaction vessel.

Generally, the reaction is conveniently carried out at atmospheric pressure, but if desired, subatmospheric or superatmospheric pressures may be applied; ordinarily, pressures below about 250 atmospheres are preferred. Solvents and/or diluents are not necessary, but may be employed; for example, hydrogen peroxide is conveniently utilized in aqueous solution, and inert diluents such as carbon dioxide and nitrogen may be introduced in gas phase reactions as exemplified by the use of air as an oxidizing agent. Under some circumstances, it may be advantageous to carry out the reaction in the presence of material inhibiting polymerization of the trifluoroacetaldehyde product; for example, an organic base such as pyridine, collidine, quinoline and the like may be introduced for this purpose.

The resulting reaction mixture may be separated into its components by usual procedures, such as fractional distillation, solvent extraction, and the like. One convenient method of separating the trifluoroacetaldehyde from the trifluoroacetic acid formed is to treat the reaction mixture with an aqueous solution of a base, thus converting the acid to a salt, and the aldehyde to a hydrate. Bases which may be employed in this step include, for example, alkali metal hydroxides such as sodium or potassium hydroxide; alkaline earth metal hydroxides such as calcium or barium hydroxide; other alkaline salts such as sodium carbonate or sodium phosphate; ammonia; and the like. The trifluoroacetaldehyde hydrate and unreacted trifluoroethanol may then be separated from the aqueous solution of the salt of trifluoroacetic acid by extraction with an organic solvent. Suitable solvents are ether, benzene, toluene, tetrahydrofuran, pyran, n-butanol and the like. The resulting organic solvent extract can be dried and subjected to fractional distillation to give any unreacted trifluoroethanol and the product trifluoroacetaldehyde hydrate. The salt of trifluoroacetic acid is obtained by evaporation of the aqueous solution. If so desired, the salt can be converted to the acid by suitable treatment with a non-volatile acid such as sulphuric or phosphoric.

Unreacted trifluoroethanol may be recycled to the process. The present process may be operated as a batch or as a cyclic process with a suitable choice of apparatus.

The invention is further illustrated but not limited by the following examples.

*Example 1*

This example illustrates the production of trifluoroacetaldehyde by the catalyzed oxidation of trifluoroethanol with oxygen.

One gram mole (100 g.) of trifluoroethanol was dropped slowly into an inclined tube packed with a catalyst composed of vanadia supported on alumina (7.5% by weight $V_2O_5$) while oxygen was passed continuously and concurrently through the tube, and the temperature in the tube was maintained at 263–282° C. The addition of the trifluoroethanol required 70 minutes. The effluent liquid was mixed with a dilute aqueous solution of sodium hydroxide, and then neutralized with sulphuric acid and extracted with ether. Trifluoroacetaldehyde hydrate was obtained as the product in 17.7% conversion and 100% yield.

In this and the other examples herein, conversion refers to the proportionate amount of trifluoroethanol converted to the stated product, as determined from the quantity of product obtained. Yield refers to the relationship between this conversion and the total quantity of trifluoroethanol converted to oxidation products, as determined by difference between the quantity of trifluoroethanol introduced into the reaction and the quantity recovered unchanged at the termination of the reaction.

*Example 2*

A stream of oxygen was bubbled through trifluoroethanol maintained at close to its boiling point, and the resulting gaseous mixture was passed through a tube packed with a vanadium pentoxide catalyst as in Example 1, maintained at 260–270° C. A total of 1 gram mole of trifluoroethanol was so vaporized and passed through the catalyst tube during 5.25 hours. From the reaction products, trifluoroacetaldehyde hydrate was isolated in 92.5% yield, 41.4% conversion, and additionally, there was obtained trifluoroacetic acid in 7.1% yield and 3.2% conversion.

*Example 3*

This example illustrates the process of the invention carried out in the presence of a base.

Using the same tube and catalyst as in Example 2, the procedure of Example 2 was repeated with the addition of the introduction of a small quantity of pyridine to the trifluoroethanol to inhibit polymerization of product aldehyde. Trifluoroacetaldehyde hydrate was obtained in good yield and conversion, together with a small amount of trifluoroacetic acid.

*Example 4*

This example illustrates the use of air as an oxidizing agent.

Air saturated with trifluoroethanol was passed through a 1 ft. x 1 in. diameter glass tube packed with a commercial vanadia-silica-potassium sulphate oxidation catalyst (Davison 900) at 265–267° C. Ten g. of the alcohol were passed in and 5 g. of liquid product were recovered. Trifluoroacetaldehyde was separated from the reactor effluent by distillation.

*Example 5*

This example illustrates the process of the invention using hydrogen peroxide as a source of oxygen.

Vanadium pentoxide was added to a mixture of trifluoroethanol and 30% hydrogen peroxide (1 part $V_2O_5$ in 87 parts $CF_3CH_2OH$), and the mixture was maintained at 5–22° C. for about 44 hours. Trifluoroacetic acid was obtained in 29% conversion and trifluoroacetaldehyde hydrate in about 3% conversion.

By contrast, substantially all of the trifluoroethanol could be recovered unreacted when a mixture of trifluoroethanol and 30% hydrogen peroxide, without the addition of vanadium pentoxide, was let stand for about 60 hours at room temperature.

*Example 6*

One gram mole (100 g.) of trifluoroethanol and 0.5 g. of vanadium pentoxide were placed in a flask fitted with stirrer, thermometer, condenser and addition funnel. The alcohol was continuously stirred while 240 g. of aqueous 30% hydrogen peroxide was added dropwise at a rate so as to maintain the reaction temperature at 65–70° C. When addition was complete, unreacted trifluoroethanol (48 g.) was recovered by distillation. The remaining aqueous mixture was made basic by addition of aqueous sodium hydroxide and then brought to approximately $pH_7$ with dilute sulphuric acid. From an ether extract of the aqueous mixture, after recovery of 18.5 g. more of trifluoroethanol, 4.8 g. of trifluoroacetaldehyde hydrate was obtained. This represents a 12.5% yield, 4.5% conversion to the aldehyde. The aqueous solution separated from the ether extraction was carefully neutralized with dilute sodium hydroxide and evaporated to dryness to yield sodium trifluoroacetate in 29.3% conversion, 87.5% yield.

While the invention has been described with reference to various particular preferred embodiments thereof, it will be appreciated that variations and modifications are possible within the scope of the appended claims.

What is claimed is:

1. The method for the oxidation of trifluoroethanol to a compound selected from the group consisting of trifluoroacetaldehyde and trifluoroacetic acid which comprises contacting trifluoroethanol in the vapor phase at a temperature from about 200° to about 300° C. with gaseous oxygen in the presence of an oxide of a metal selected from the group consisting of vanadium, chromium, molybdenum, tungsten and uranium.

2. The method of claim 1 in which the oxide is vanadium pentoxide.

3. The method for the preparation of trifluoroacetaldehyde hydrate which comprises contacting trifluoroethanol in the vapor phase at a temperature in the range from about 200° to 300° C. with a gaseous source of oxygen selected from the group consisting of oxygen and air in the presence of vanadium pentoxide and treating the resulting trifluoroacetaldehyde with an aqueous base selected from the group consisting of ammonia and hydroxides, carbonates and phosphates of alkali and alkaline earth metals.

4. The method for the preparation of trifluoroacetaldehyde which comprises contacting trifluoroethanol in the vapor phase at a temperature in the range from about 200° to 300° C. with gaseous oxygen in the presence of vanadium pentoxide.

5. The method for the oxidation of trifluoroethanol to a compound selected from the group consisting of trifluoroacetaldehyde and trifluoroacetic acid which comprises contacting trifluoroethanol with a peroxy compound in the presence of an oxide of a metal selected from the group consisting of vanadium, chromium, molybdenum, tungsten and uranium at a temperature in the range from about 5° to about 70° C.

6. The method of claim 5 in which the oxide is vanadium pentoxide.

7. The method according to claim 5 in which the peroxy compound is hydrogen peroxide.

8. The method which comprises contacting trifluoroethanol with a peroxy compound in the presence of vanadium pentoxide at a temperature in the range from about 5° to about 70° C. to form a mixture of trifluoroacetaldehyde and trifluoroacetic acid and isolating from said mixture a compound selected from the class consisting of trifluoroacetic acid and salts thereof formed by treatment of said mixture with an aqueous solution of a base selected from the group consisting of ammonia and hydroxides, carbonates and phosphates of alkali and alkaline earth metals.

9. The method for the preparation of trifluoroacetic acid which comprises contacting trifluoroethanol with air in the presence of vanadium pentoxide at a temperature of from about 200° to about 300° C. to form trifluoroacetic acid and recovering said acid from the reaction mass.

10. The method for the oxidation of trifluoroethanol to a compound selected from the group consisting of trifluoroacetaldehyde and trifluoroacetic acid which comprises contacting trifluoroethanol with air in the presence of vanadium pentoxide at a temperature of from about 200° to about 300° C.

References Cited in the file of this patent

UNITED STATES PATENTS

| | | |
|---|---|---|
| 1,636,952 | Craver | July 26, 1927 |
| 2,263,607 | Bludworth | Nov. 25, 1941 |
| 2,353,160 | Hull | July 11, 1944 |
| 2,506,068 | Crawford et al. | May 2, 1950 |

OTHER REFERENCES

Swarts: "Compt. rend.," vol. 197, pages 1261–1264 (1933).

Powell et al.: Org. Synthesis, Coll., vol. 1, p. 168 (1941).

Aliphatic Fluorine Compounds, Lovelace et al., pages 188 and 205 (1958).